United States Patent [19]
Nishio

[11] Patent Number: 5,743,572
[45] Date of Patent: Apr. 28, 1998

[54] PIPE JOINT MADE OF RESIN

[75] Inventor: Kiyoshi Nishio, Sanda, Japan

[73] Assignee: Nippon Pillar Packing Co., Ltd., Osaka, Japan

[21] Appl. No.: 896,764

[22] Filed: Jul. 18, 1997

[30] Foreign Application Priority Data

Aug. 9, 1996 [JP] Japan ................................. 8-211385

[51] Int. Cl.$^6$ .................................................. F16L 25/00
[52] U.S. Cl. ....................... 285/331; 285/334.1; 285/354; 285/423; 285/351
[58] Field of Search ................................. 285/332, 331, 285/354, 423, 318, 334.1, 353, 351

[56] References Cited

U.S. PATENT DOCUMENTS

| | | | |
|---|---|---|---|
| 5,154,453 | 10/1992 | Nishio | 285/423 |
| 5,388,871 | 2/1995 | Saitoh | 285/423 X |

FOREIGN PATENT DOCUMENTS

| | | | |
|---|---|---|---|
| 275749 | 7/1988 | European Pat. Off. | 285/423 |

*Primary Examiner*—Dave W. Arola
*Attorney, Agent, or Firm*—Jones, Tullar & Cooper, P.C.

[57] ABSTRACT

The present invention relates to a pipe joint made of resin which is preferably used in, particularly, piping for a liquid having high purity or ultrapure water. In the pipe joint made of resin, a pipe receiving port 11 of a joint body made of resin 1, an inner ring 3, and a pressing ring 5 form primary, secondary, and tertiary sealing portions 10, 20, and 30. The primary sealing portion 10 is formed by a pressingly contacting area between a primary seal receiving face 13 of the joint body 1 and a primary seal urging face of the inner ring 3, thereby generating a seal contact pressure in an axial direction. The secondary sealing portion 20 is formed by pressingly contacting areas between secondary seal inner and outer receiving faces 15 and 16 of the joint body 1 and secondary seal inner and outer urging faces 36 and 37 of the inner ring 3, thereby generating a seal contact pressure in a radial direction. The tertiary sealing portion 30 is formed by a pressingly contacting area between a tertiary seal receiving face 17 of the pipe receiving port 11 and a tertiary seal urging face 71 of the pipe 7, thereby generating a seal contact pressure in an axial direction. According to the invention, high skill and experience are not required in a connecting operation, and an excellent sealing property is ensured for a long term.

12 Claims, 6 Drawing Sheets

PIPE JOINT MADE OF RESIN

BACKGROUND OF THE INVENTION

1. Field of the Invention

The present invention relates to a pipe joint made of resin, and particularly to a pipe joint made of resin which is used in piping for a liquid having high purity or ultrapure water to be handled in a production process of various fields such as production of semiconductor devices, production of medical equipment and medicines, food processing, and chemical industry.

2. Description of the Prior Art

Conventionally, as pipe joints made of resin of this kind, those having configurations shown in FIGS. 8 to 10 are known.

A pipe joint made of resin shown in FIG. 8 comprises a joint body 81, an inner ring 82, and a pressing ring 83.

The joint body 81 comprises a pipe receiving port 84, a tapered primary seal receiving face 85, and a tapered secondary seal receiving face 86 which is formed at the tip end of the pipe receiving port 84. An external thread portion 87 is formed on the outer periphery of the pipe receiving port 84. The inner ring 82 comprises a connecting portion 89 having a bulge portion 88 of a mountain-like section shape, and a projected portion 90. A tapered primary seal urging face 91 is formed at the tip end of the projected portion 90. The pressing ring 83 comprises a pressing piece 92.

In the pipe joint made of resin, one end of a pipe made of resin 7 which is pressingly inserted into the connecting portion 89 is increased in diameter and a tapered secondary seal urging face 93 is formed on the outer peripheral face of the pipe 7. The inner ring 82 having the connecting portion 89 to which one end of the pipe 7 is connected by the press insertion is inserted into the pipe receiving port 84 of the joint body 81. An internal thread portion 94 of the pressing ring 83 which is previously fitted onto the pipe 7 is screwed on the external thread portion 87 of the pipe receiving port 84, and then fastened. The pressing piece 92 of the pressing ring 83 presses the inner ring 82 in the insertion direction. This causes the primary seal urging face 91 of the inner ring 82 to be pressingly contacted with the primary seal receiving face 85 of the joint body 81, and the secondary seal urging face 93 of the pipe 7 to be pressingly contacted with the secondary seal receiving face 86 of the pipe receiving port 84, thereby providing the contacting area with a sealing ability.

A pipe joint made of resin shown in FIG. 9 comprises a joint body 95, an outer ring 96, and a pressing ring 97.

The joint body 95 comprises a pipe receiving port 98, and a tapered seal receiving face 99 which is formed at the tip end of the pipe receiving port 98. An external thread portion 101 is formed on the outer periphery of the pipe receiving port 98. The outer ring 96 comprises a tapered seal urging face 102 which is formed at the tip end of the ring.

In the pipe joint made of resin, the outer ring 96 is pressingly fitted onto the outside of one end of a pipe made of resin 7, thereby joining the outer ring 96 to the one end of the pipe 7. The one end of the pipe 7 which is projected from the outer ring 96 in this way is inserted into the pipe receiving port 98, and the seal urging face 102 of the outer ring 96 is pressed against the seal receiving face 99 of the pipe receiving port 98. An internal thread portion 103 of the pressing ring 97 is screwed on the external thread portion 101 of the pipe receiving port 98, and then fastened. The seal urging face 102 of the outer ring 96 which is pressed by the pressing ring 97 is pressingly contacted with the seal receiving face 99 of the pipe receiving port 98, thereby providing the contacting area with a sealing ability.

A pipe joint made of resin shown in FIG. 10 comprises a joint body 104, an inner ring 105, and a pressing ring 106.

The joint body 104 comprises a pipe receiving port 107 which is formed at one end in the axial direction, and a tapered seal receiving face 108 which is formed at the tip end of the pipe receiving port 107. An external thread portion 109 is formed on the outer periphery of the pipe receiving port 107. The inner ring 105 is formed so as to have a mountain-like section shape.

In the pipe joint made of resin, one end of a pipe made of resin 7 into which the inner ring 105 is pressingly inserted is increased in diameter and a tapered seal urging face 110 is formed on the outer peripheral face of the pipe 7. One end of the pipe 7 into which the inner ring 105 is pressingly inserted is inserted into the pipe receiving port 107. The internal thread portion 112 of the pressing ring 106 which is previously fitted onto the pipe 7 is screwed on the external thread portion 109 of the pipe receiving port 107, and then fastened. The pressing piece 106 presses the pipe 7 and the inner ring 105 in the insertion direction. This causes the seal urging face 110 of the pipe 7 to be pressingly contacted with the seal receiving face 108 of the pipe receiving port 107, thereby providing the contacting area with a sealing ability.

In the prior art pipe joint made of resin described with reference to FIGS. 8 to 10, the seal contact pressure in the axial direction is generated by the pressing force in the insertion direction which is exerted by fastening of the pressing ring 83, 97, or 106. Therefore, there is a fear that temporal creep or stress relaxation produced in the pressing ring 83, 97, or 106 and the pipe 7 which are made of resin reduces the seal contact pressure in the sealing area, whereby the sealing property is impaired in a relatively early stage.

In order to ensure a predetermined sealing property, the fastening amount of the pressing ring 83, 97, or 106, the fastening torque, and the like must be controlled highly accurately so that the fastening force of the pressing ring 83, 97, or 106 is strictly set to be a predetermined degree. This produces a problem in that a connecting operation requires high skill and experience.

SUMMARY OF THE INVENTION

The present invention has been conducted in view of the above-mentioned circumstances.

It is an object of the invention to provide a pipe joint made of resin in which the sealing property is hardly lowered by temporal creep or stress relaxation.

It is another object of the invention to provide a pipe joint made of resin which does not require high skill and experience in a connecting operation.

In order to attain the objects, the pipe joint made of resin of the invention comprises the following elements:

- a joint body which is made of synthetic resin and which has a cylindrical pipe receiving port at one end;
- a cylindrical portion which is disposed on the joint body and which is projected into the pipe receiving port concentrically with the pipe receiving port;
- a primary seal receiving face which is formed in a flaringly tapered manner on an inner peripheral portion of a tip end of the cylindrical portion;
- secondary seal inner and outer receiving faces, the secondary seal inner receiving face being formed by a small-diameter wall face of an annular groove which is formed between the pipe receiving port and the cylindrical portion, the secondary seal outer receiving face being formed by a large-diameter wall face of the annular groove;

a sleeve-like inner ring which is made of synthetic resin, which has a connecting portion and a projected portion, and which is inserted into the pipe receiving port, the connecting portion being pressingly inserted into the one end of the pipe made of synthetic resin to be connected to the one end, the projected portion being projected from the one end of the pipe when the connecting portion is connected to the one end of the pipe;

a primary seal urging face which is formed in a tapered manner on an inner peripheral portion of a tip end of the projected portion of the inner ring, and which is pressingly contacted with the primary seal receiving face;

a projected cylindrical portion which is projected from an outer peripheral portion of the tip end of the projected portion of the inner ring, and which is pressingly inserted into the annular groove;

secondary inner and outer urging faces, the secondary inner urging face being formed by an inner peripheral face of the projected cylindrical portion and pressingly contacted with the secondary seal inner receiving face, the secondary outer urging face being formed by an outer peripheral face of the projected cylindrical portion and pressingly contacted with the secondary seal outer receiving face;

a pressing ring which is screwed on the pipe receiving port of the joint body; and a pressing portion which is disposed on the pressing ring, and which, when the pressing ring is screwed on the pipe receiving port, applies a pressing force in the insertion direction to the inner ring which is connected to the one end of the pipe and inserted into the pipe receiving port.

According to the pipe joint made of resin of the invention, the projected portion of the inner ring which is connected to a pipe made of resin by pressingly inserting the connecting portion into the pipe is inserted into the pipe receiving port of the joint body, and the pressing ring which is previously fitted onto the pipe is screwed on the pipe receiving port and fastened. The projected cylindrical portion of the inner ring is pressingly inserted into the annular groove of the joint body, and the primary seal urging face of the inner ring is pressingly contacted with the primary seal receiving face of the cylindrical portion. Therefore, a seal contact pressure in the axial direction is generated in the pressingly contacting area (primary sealing portion) between the primary seal receiving face and the primary seal urging face, thereby primarily ensuring the sealing performance. Since the projected cylindrical portion is pressingly inserted into the annular groove, the secondary inner urging face is pressingly contacted with the secondary inner receiving face, and the secondary outer urging face is pressingly contacted with the secondary outer receiving face. Therefore, a seal contact pressure in a radial direction is generated in the pressingly contacting area (secondary sealing portion), thereby secondarily ensuring the sealing performance.

In this way, accordingly to the invention, a seal contact pressure is generated at two areas in different directions, i.e., the axial and radial directions, and a double sealing portion is formed by the primary and secondary sealing portions. Even when temporal creep or stress relaxation is produced in the pressing ring, the pipe, or the like and the seal contact pressure in the axial direction of the primary sealing portion is lowered, the seal contact pressure in a radial direction of the secondary sealing portion is not lowered. Consequently, the sealing property is ensured for a long term by the secondary sealing portion. Furthermore, the sealing property due to the secondary sealing portion is independent of the degree of the fastening force of the pressing ring, and hence it is not required to strictly set the fastening force of the pressing ring in a connecting operation. In a connecting operation, therefore, high skill and experience are not required.

In the invention, the primary seal receiving face which is formed in a flaringly tapered manner on the inner peripheral portion of the tip end of the cylindrical portion of the joint body overlaps with the primary seal urging face of the inner ring, from the outer side in a radial direction. Even when the cylindrical portion is affected by the press insertion of the projected cylindrical portion into the annular groove and disposed to be deformed in a falling manner in a diameter-reducing direction, therefore, the force causing the deformation of the cylindrical portion serves to increase the pressingly contacting force exerted between the primary seal receiving face and the primary seal urging face, and the sealing property of the primary sealing portion is improved. The force causing the deformation of the cylindrical portion is received by the primary seal urging face, so that the falling deformation in a diameter-reducing direction of the cylindrical portion is prevented from occurring, whereby the sealing property of the secondary sealing portion is prevented from being lowered.

According to another invention, the connecting portion of the inner ring comprises a bulge portion which has a mountain-like section shape, and which increases a diameter of the pipe into which the connecting portion is pressingly inserted, thereby forming a tertiary seal urging face and a pressure receiving face on an outer peripheral face of the pipe, the tertiary seal urging face having a tapered shape in which a diameter is reduced as moving toward a tip end of the pipe, the pressure receiving face having a tapered shape in which a diameter is increased as moving toward the tip end of the pipe, a tertiary seal receiving face which is formed in a flaringly tapered manner and with which the tertiary seal urging face is pressingly contacted is formed at a tip end of the pipe receiving port, and an inner peripheral end of the pressing portion is formed into an annular edge which abuts against the pressure receiving face and which applies the pressing force in the insertion direction to the pressure receiving face.

In the invention, when the pressing ring is screwed on the pipe receiving port, the annular edge of the pressing ring abuts against the pressure receiving face formed on the pipe, and the pressure receiving face is pressed in the insertion direction by the annular edge. When the pressure receiving face is pressed in the insertion direction, the tertiary seal urging face formed on the pipe is pressingly contacted with the tertiary seal receiving face of the tip end of the pipe receiving port, and a seal contact pressure in the axial direction is generated in the pressingly contacting area (tertiary sealing portion). In addition to the above-mentioned primary and secondary sealing properties respectively due to the primary and secondary sealing portions, the sealing performance due to the tertiary sealing portion is tertiarily ensured. This serves to ensure the sealing portion in triplicate.

According to a further invention, a distance in a radial direction between the secondary seal inner and outer receiving faces is set to be 60 to 99%, preferably, 70 to 90% of a thickness of the projected cylindrical portion which coincides with a distance in a radial direction between the secondary seal inner and outer urging faces.

When the ratio of the distance in a radial direction between the secondary seal inner and outer receiving faces to the thickness of the projected cylindrical portion is set in this way, the projected portion of the inner ring can be pressingly inserted into the annular groove of the joint body, only by fastening the pressing ring and without using a dedicated jig or a special jig. Therefore, the workability of the connecting operation is enhanced.

According to a still further invention, when a diameter of the secondary seal outer receiving face is indicated by OR1, a diameter of the secondary seal inner receiving face is indicated by OR2, a diameter of the secondary seal outer urging face is indicated by UR1, and a diameter of the secondary seal inner urging face is indicated by UR2, relationships defined by one of following (1), (2), and (3) are established:

$$UR1=OR1 \text{ and } UR2<OR2 \quad (1)$$
$$UR1>OR1 \text{ and } UR2=OR2 \quad (2)$$
$$UR1>OR1 \text{ and } UR2<OR2 \quad (3)$$

According to a still further invention, the tip end of the projected cylindrical portion is chamfered in a tapered shape, and a width of a tip end face of the projected cylindrical portion is smaller than the distance in a radial direction between the secondary seal inner and outer receiving faces.

In this configuration, the projected cylindrical portion of the inner ring can be easily pressingly inserted into the annular groove of the joint body. Even when the seal contact pressure in a radial direction of the secondary sealing portion is increased so that the sealing performance is highly exerted, therefore, the projected cylindrical portion of the inner ring can be pressingly inserted into the annular groove of the joint body easily and smoothly.

The pipe joint made of resin of the invention means not only an independent pipe joint made of resin, but also a pipe joint made of resin in which the joint body is integrated with a fluid apparatus.

Other features and effects of pipe joint made of resin of the invention will be apparent from the following description of an embodiment.

DETAILED DESCRIPTION OF THE PREFERRED EMBODIMENT

Hereinafter, an embodiment of the invention will be described with reference to the accompanying drawings.

The illustrated pipe joint made of resin comprises a cylindrical joint body 1, a cylindrical inner ring 3, and a cap nut-like pressing ring 5. The joint body 1, the inner ring 3, and the pressing ring 5 are independently molded into one body by synthetic resin having excellent chemical resistance and heat resistance, such as PFA (perfluoroalkoxyfluoro plastics), PTFE (polytetrafluoroethylene), ETFE (ethylene-trifluoro-ethylene), CTFE (chloro-trifluoroethylene), or ECTFE (ethylene-chloro-trifluoro-ethylene).

Figure 3:
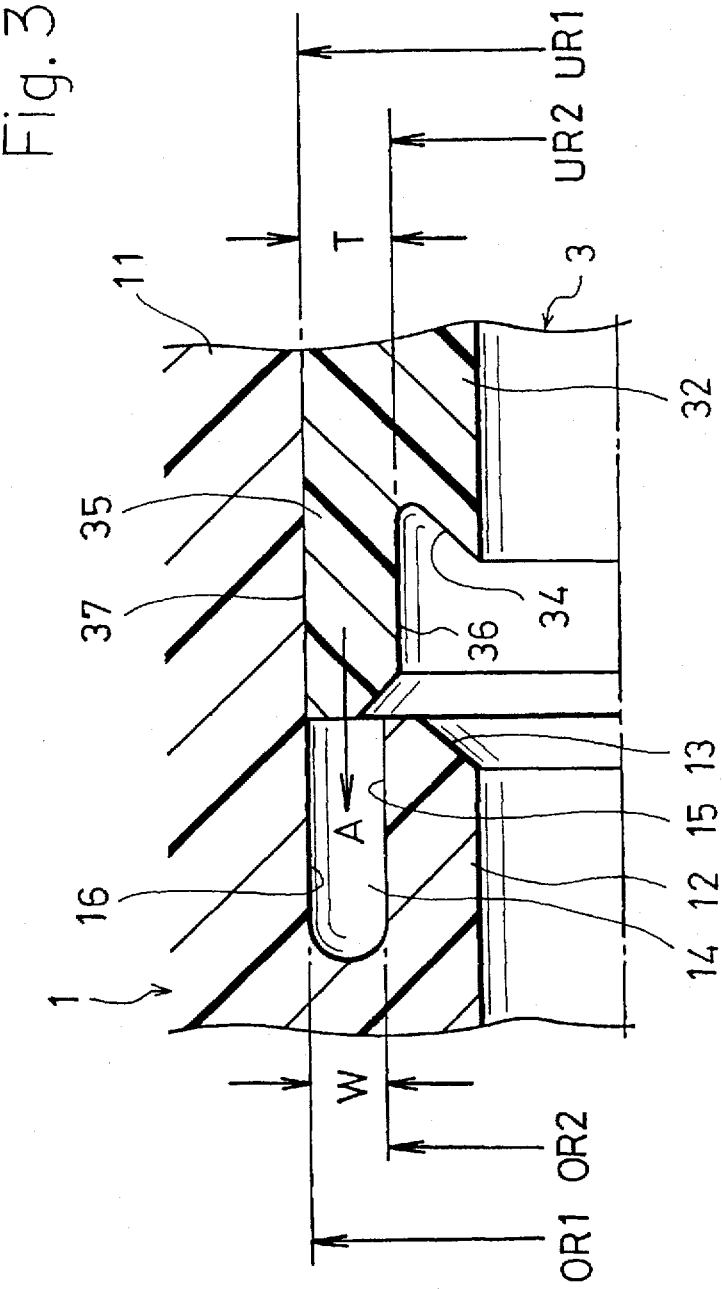
FIG. 3 is an enlarged section view of main portions and showing an early stage of a connecting operation.

The joint body 1 comprises a cylindrical pipe receiving port 11 at least one end in the axial direction, and a short cylindrical portion 12 which is coaxial with the pipe receiving port 11 and projected into the pipe receiving port 11. As shown in FIG. 3 and the like, a primary seal receiving face 13 which is formed in a flaringly tapered manner is disposed on an inner peripheral portion of a tip end of the cylindrical portion 12. An annular groove 14 is formed between the pipe receiving port 11 and the cylindrical portion 12. The small-diameter wall face of the annular groove 14 forms a secondary seal inner receiving face 15, and the large-diameter wall face of the annular groove forms a secondary seal outer receiving face 16. A tertiary seal receiving face 17 which is flaringly tapered is formed at a tip end of the pipe receiving port 11 so as to be coaxial with the pipe receiving port 11. An external thread portion 18 is formed on the outer peripheral portion of the pipe receiving port 11.

Figure 1:
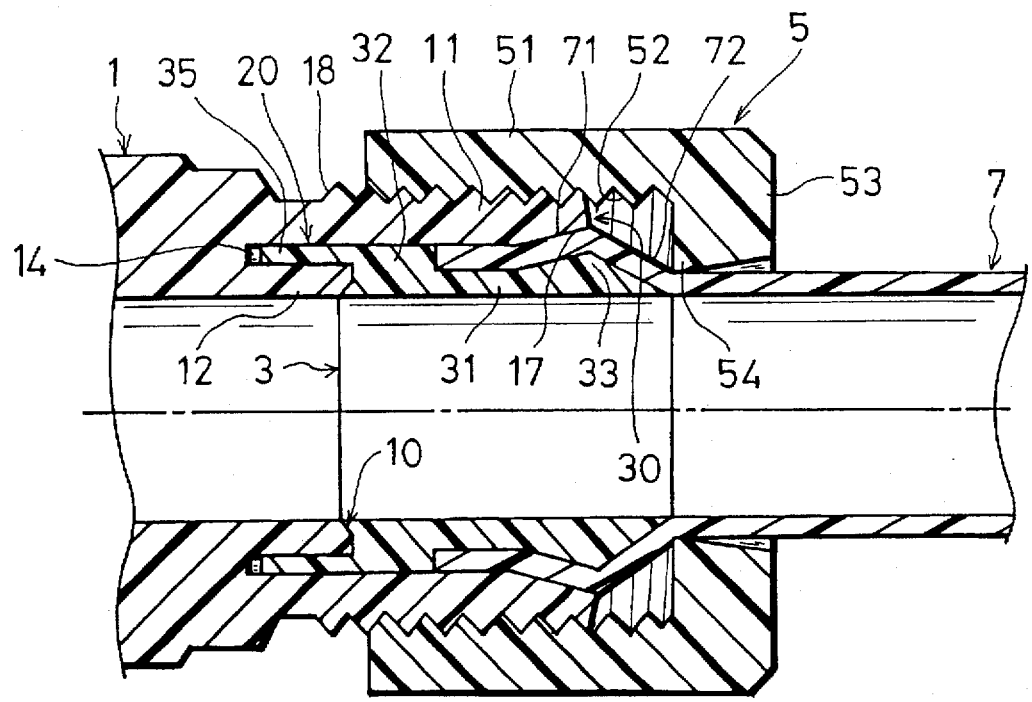
FIG. 1 is a longitudinal sectional side view showing an embodiment of the pipe joint made of resin of the invention.
Figure 2:
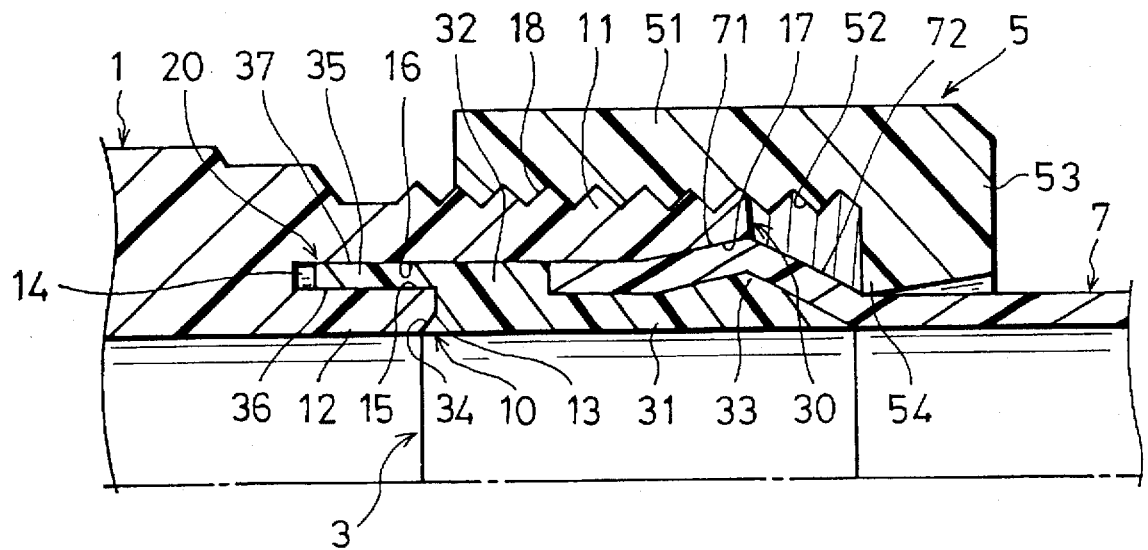
FIG. 2 is an enlarged half section view of main portions of FIG. 1.

The inner ring 3 is formed so as to have an inner diameter which is equal to the inner diameters of a pipe made of synthetic resin 7 and the joint body 1. When the pipe 7 is connected to the joint body 1 by using the inner ring 3 as shown in FIGS. 1 and 2, therefore, a fluid smoothly flows through internal paths of the pipe 7, the inner ring 3, and the joint body 1. As shown in FIGS. 1 and 2, the inner ring 3 comprises a connecting portion 31 which is pressingly inserted into one end of the pipe made of synthetic resin 7 to be connected thereto, and a projected portion 32 which, when the connecting portion 31 is connected to the one end of the pipe 7, is projected from the one end of the pipe 7. The connecting portion 31 of the inner ring 3 comprises a bulge portion 33 having a mountain-like section shape. When the connecting portion 31 is pressingly inserted into the one end of the pipe 7, the diameter of the pipe 7 into which the connecting portion 31 is pressingly inserted is increased, and a tertiary seal urging face 71 having a tapered shape in which the diameter is reduced as moving toward the tip end of the pipe 7, and a pressure receiving face 72 having a tapered shape in which the diameter is increased as moving toward the tip end of the pipe 7 is formed on the outer peripheral face of the pipe 7. In the inner ring 3, as shown in FIG. 3 and the like, a tapered primary seal urging face 34 is formed on an inner peripheral portion of a tip end of the projected portion 32. A projected cylindrical portion 35 which is formed by synthetic resin integrally with an outer peripheral portion of the tip end of the projected portion 32 is projected in the axial direction. The inner peripheral face of the projected cylindrical portion 35 serves as a secondary seal inner urging face 36, and the outer peripheral face as a secondary seal outer urging face 37. The primary seal urging face 34 can be pressingly contacted with the primary seal receiving face 13, and the projected cylindrical portion 35 can be pressingly inserted into the annular groove 14. The inner ring 3 can be inserted into the pipe receiving port.

The pressing ring 5 comprises an internal thread portion 52 on an inner peripheral portion of an outer ring section 51. An inner flange-like pressing piece 53 is continuously integrated with the outer end of the outer ring section 51. An annular edge 54 is formed at the inner end on the side of the inner periphery of the pressing piece 53. The inner diameter of the inner flange-like pressing piece 53 has a value which allows the pressing piece 53 to be fitted onto the pipe 7. The inner diameter of the annular edge 54 is equal to or slightly larger than the diameter of a part of the pressure receiving face 72 where the diameter is smallest.

Figure 6:
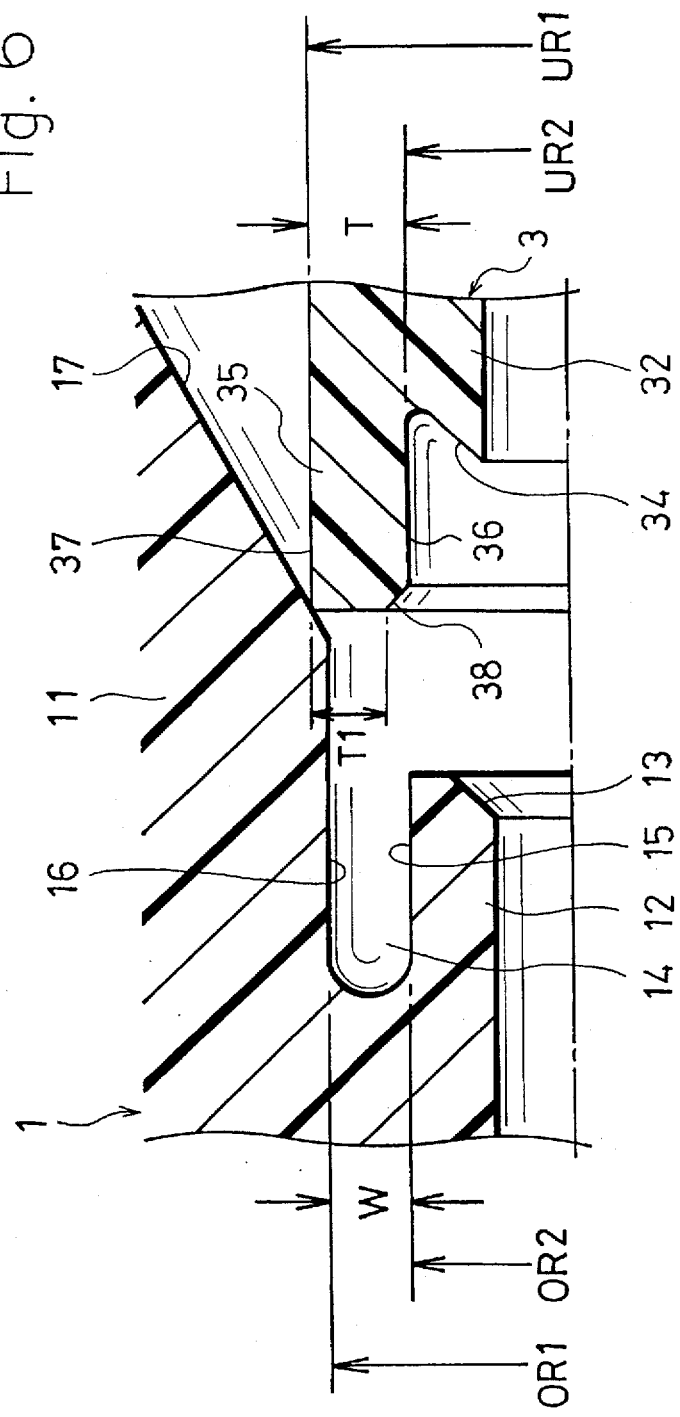
FIG. 6 is an enlarged longitudinal sectional side view of main portions and showing another embodiment of the pipe joint made of resin of the invention.

Referring to FIGS. 3 and 6, the distance W in a radial direction between the secondary seal inner and outer receiving faces 15 and 16 of the joint body 1 is set to be 60 to 99%, preferably, 70 to 90% of the thickness T of the projected cylindrical portion 35. The thickness T of the projected cylindrical portion 35 coincides with the distance in a radial direction between the secondary seal inner and outer urging faces 36 and 37.

The distance W in a radial direction between the secondary seal inner and outer receiving faces 15 and 16 and the thickness T of the projected cylindrical portion 35 are set to have the above-mentioned mutual relationship, in either of the following three methods. When the diameter of the secondary seal outer receiving face 16 is indicated by OR1, that of the secondary seal inner receiving face 15 is indicated by OR2, that of the secondary seal outer urging face 37 is indicated by UR1, and that of the secondary seal inner urging face 36 is indicated by UR2, relationships defined by one of the following expressions are established:

$$UR1 = OR1 \text{ and } UR2 < OR2 \quad (1)$$

$$UR1 > OR1 \text{ and } UR2 = OR2 \quad (2)$$

$$UR1 > OR1 \text{ and } UR2 < OR2 \quad (3)$$

FIG. 3 shows the relationships defined by expression (1), and FIG. 6 the relationships defined by expression (2).

When relationships defined by one of above expressions (1), (2), and (3) are established, preferably, the tip end of the projected cylindrical portion 35 is chamfered in a tapered shape, so that the width T1 (see FIG. 6) of a tip end face of the projected cylindrical portion 35 is smaller than the distance W in a radial direction between the secondary seal inner and outer receiving faces 15 and 16. In this configuration, even when the thickness T of the projected cylindrical portion 35 is larger than the distance W in a radical direction between the secondary seal inner and outer receiving faces 15 and 16, the projected cylindrical portion 35 can be easily pressingly inserted between the receiving faces 15 and 16. In FIGS. 3 and 6, the face formed by chamfering the tip end of the projected cylindrical portion 35 is indicated by a reference numeral 38.

In the pipe joint made of resin comprising the joint body 1, the inner ring 3, and the pressing ring 5, when the inner ring 3 is connected to the pipe made of resin 7 by pressingly inserting the connecting portion 31 of the inner ring 3 into one end of the pipe 7, the diameter of the pipe 7 in a part corresponding to the bulge portion 33 is increased, and hence the tertiary seal urging face 71 and the pressure receiving face 72 are formed on the outer peripheral face of the pipe 7. The bulge portion 33 which increase the diameter of the pipe 7 exerts a function of preventing the inner ring from slipping from the pipe 7. This locking function enables the inner ring 3 to be connected to the pipe 7 under a state where the connecting portion 31 hardly slips from the pipe 7.

Figure 4:
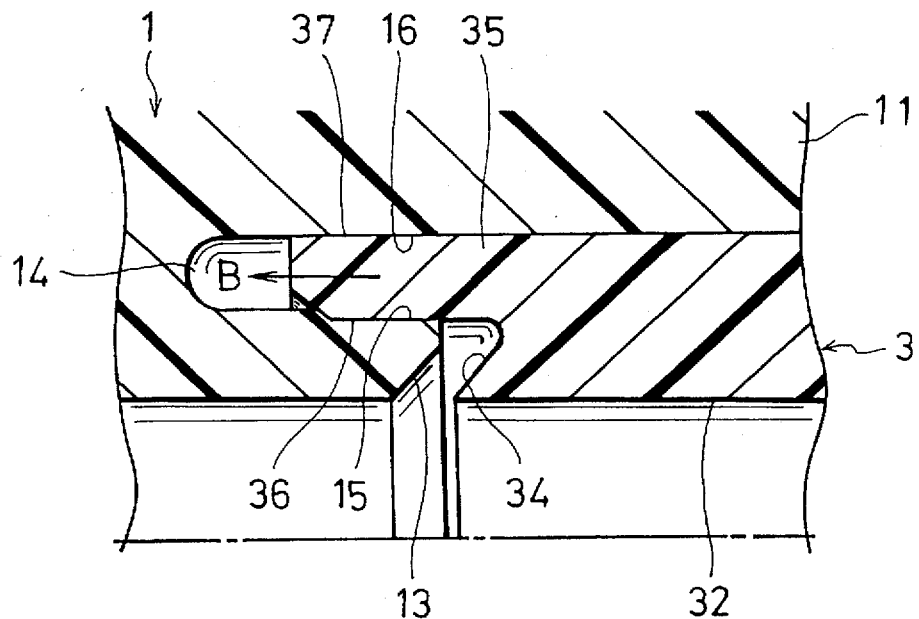
FIG. 4 is an enlarged section view of main portions and showing an intermediate stage of the connecting operation.
Figure 5:
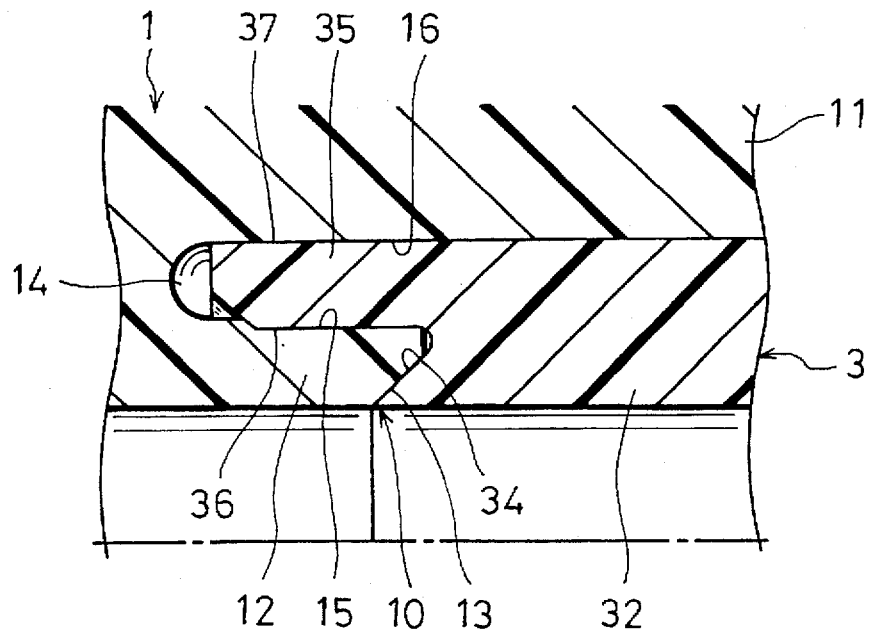
FIG. 5 is an enlarged section view of main portions and showing a completion timing of the connecting operation.

The projected portion 32 of the inner ring 3 connected to the pipe 7 is inserted into the pipe receiving port 11 of the joint body 1 as indicated by the arrow A of FIG. 3. Thereafter, the internal thread portion 52 of the pressing ring 5 which is previously fitted onto the pipe 7 is screwed on the external thread portion 18 of the pipe receiving port 11, and the pressing ring 5 is fastened. As indicated by the arrow B of FIG. 4, the projected cylindrical portion 35 of the inner ring 3 is gradually pressingly inserted into the annular groove 14 of the joint body 1. As shown in FIG. 5, the primary seal urging face 34 of the inner ring 3 is pressingly contacted with the primary seal receiving face 13 of the cylindrical portion 12, and, as shown in FIGS. 1 and 2, the tertiary seal urging face 71 of the pipe 7 is pressingly contacted with the tertiary seal receiving face 17 of the pipe receiving port 11.

According to this configuration, as shown in FIGS. 1, 2, and 5, a primary sealing portion 10 is formed by the pressingly contacting area between the primary seal receiving face 13 and the primary seal urging face 34. As shown in FIGS. 1 and 2, a secondary sealing portion 20 is formed by 15 the pressingly contacting areas between the secondary seal outer receiving face 16 and the secondary seal outer urging face 37, and between the secondary seal inner receiving face 15 and the secondary seal inner urging face 36, and a tertiary sealing portion 30 is formed at the pressingly contacting area between the tertiary seal receiving face 17 and the tertiary seal urging face 71. In the primary and tertiary sealing portions 10 and 30, a seal contact pressure in the axial direction is generated so as to primarily and tertiarily ensure the sealing performance. In the secondary sealing portion 20, a seal contact pressure in a radial direction is generated so as to secondarily ensure the sealing performance. The secondary sealing portion 20 elongates in the axial direction. When the pressing ring 5 is further fastened so as to advance, therefore, the length of the secondary sealing portion 20 is further increased and the sealing property of the corresponding area is enhanced.

When the pipe 7 is connected to the pipe joint in this way, a seal contact pressure in the axial direction is generated in the primary and tertiary sealing portions 10 and 30, and a seal contact pressure in a radial direction is generated in the secondary sealing portion 20. In the connecting portion, therefore, a sealing portion is formed in triplicate. Even when the sealing performance is impaired in one of the sealing portions, the other sealing areas maintain the required sealing performance. Even when temporal creep or stress relaxation is produced in the pressing ring 5, the pipe 7, or the like and the seal contact pressure in the axial direction of, for example, the primary sealing portion 10 is lowered, the seal contact pressure in a radial direction of the secondary sealing portion 20 is not lowered. Consequently, the sealing property is ensured for a long term by the secondary sealing portion 20, thereby surely preventing a fluid leakage from occurring. Furthermore, the sealing property of the secondary sealing portion 20 is independent of the degree of the fastening force of the pressing ring 5. Even when the fastening force of the pressing ring 5 is not strictly set in a connecting operation, therefore, an excellent sealing performance can be exerted. Consequently, high skill and experience are not required in a connecting operation.

The primary seal receiving face 13 which is formed in a flaringly tapered manner on the inner peripheral portion of the tip end of the cylindrical portion 12 of the joint body 1 overlaps with the primary seal urging face 34 of the inner ring 3, from the outer side in a radial direction. Even when the cylindrical portion 12 is affected by the press insertion of the projected cylindrical portion 35 into the annular groove 14 and disposed to be deformed in a falling manner in a diameter-reducing direction, therefore, the force causing the deformation of the cylindrical portion 12 serves to increase the pressingly contacting force exerted between the primary seal receiving face 13 and the primary seal urging face 34, and the sealing property of the primary sealing portion 10 is improved. The force causing the deformation of the cylindrical portion 12 is received by the primary seal urging face 34, so that the falling deformation in a diameter-reducing direction of the cylindrical portion 12 is prevented from occurring, whereby the sealing property of the secondary sealing portion 20 is prevented from being lowered.

Figure 7:
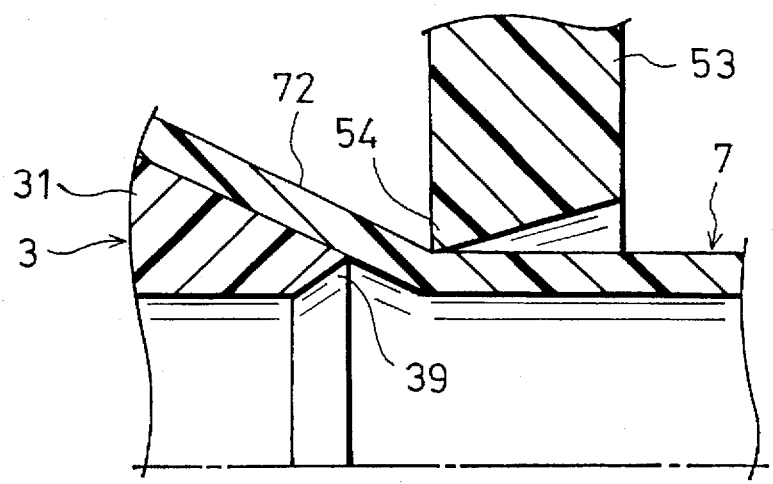
FIG. 7 is an enlarged longitudinal sectional side view of main portions and showing main portions of a further embodiment of the pipe joint made of resin of the invention.
Figure 8:
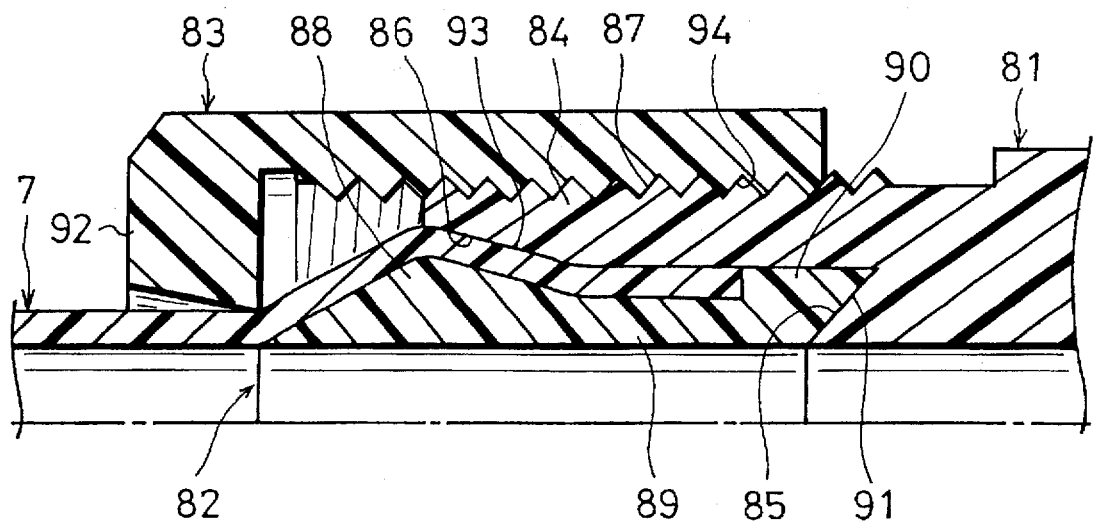
FIG. 8 is an enlarged half section view of main portions and showing an example of a pipe joint made of resin of the prior art.
Figure 9:
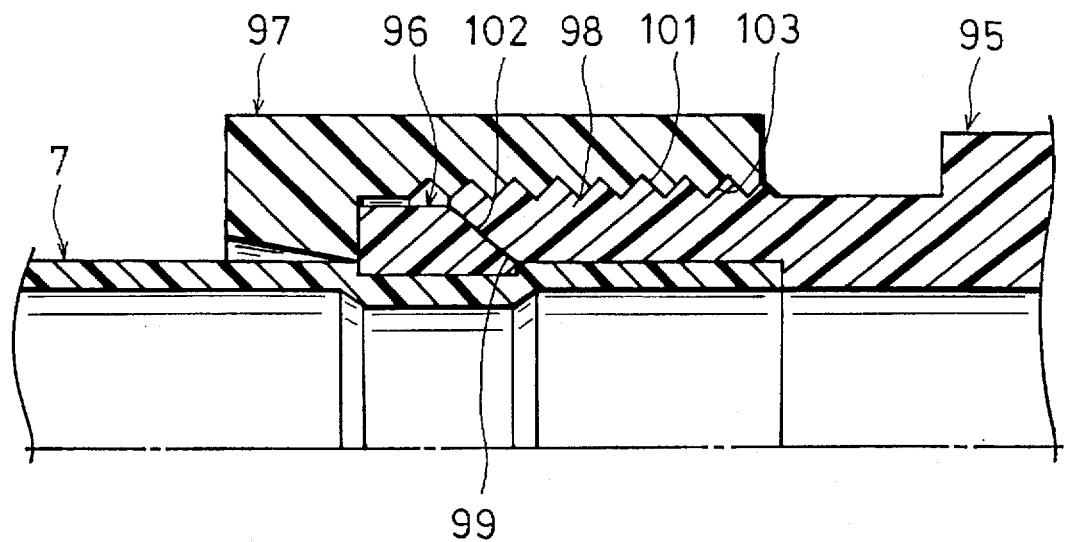
FIG. 9 is an enlarged half section view of main portions and showing another example of a pipe joint made of resin of the prior art.
Figure 10:
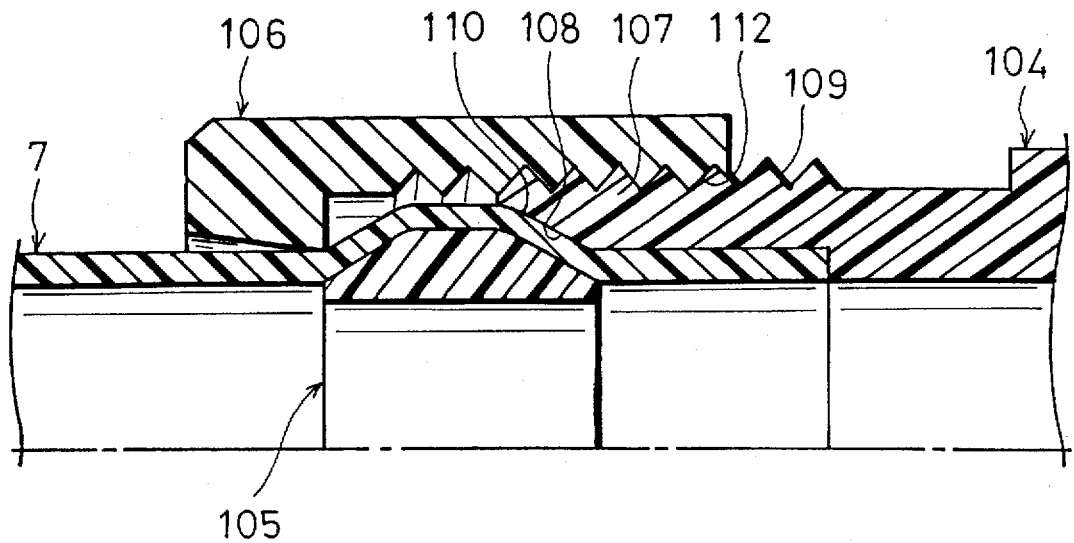
FIG. 10 is an enlarged half section view of main portions and showing a further example of a pipe joint made of resin of the prior art.

In the embodiment, as shown in FIG. 7, the inner peripheral portion of the tip end of the connecting portion 31 of the inner ring 3 may be chamfered, so that a recess 39 surrounded by the inner peripheral portion of the tip end and the pipe 7 is formed. The recess 39 can positively form a flow region for the fluid, whereby fluid stagnation is prevented from occurring. Such a pipe joint can be preferably used as a pipe joint for a liquid having high purity or ultrapure water.

The entire disclosure of Japanese Patent Application No. 8-211385 filed on Aug. 9, 1996 including specification, claims, drawings and summary are incorporated herein by reference in its entirety.

What is claimed is:

1. A pipe joint made of resin comprising:

a joint body which is made of synthetic resin and which has a cylindrical pipe receiving port at one end;

a cylindrical portion which is disposed on said joint body and radially spaced therefrom forming an annular groove therebetween and which is projected into said pipe receiving port concentrically with said pipe receiving port terminating in said pipe receiving port in a tip end;

a primary seal receiving face which is formed in a flaringly tapered manner on an inner peripheral portion of said tip end of said cylindrical portion;

secondary seal inner and outer receiving faces, said secondary seal inner receiving face being formed by a small-diameter wall face of said annular groove between said pipe receiving port and said cylindrical portion, said secondary seal outer receiving face being formed by a large-diameter wall face of said annular groove;

a sleeve-like inner ring which is made of synthetic resin, which has a connecting portion and a projected portion terminating in a tip end, and which is inserted into said pipe receiving port, said connecting portion being pressingly inserted into the one end of a pipe made of synthetic resin connected to the one end, said projected portion projecting from the one end of said pipe;

a primary seal urging face which is formed in a tapered manner on an inner peripheral portion of said tip end of said projected portion of said inner ring, and which is pressingly contacted with said primary seal receiving face;

a projected cylindrical portion projected from an outer peripheral portion of the tip end of said projected portion of said inner ring, and which is pressingly inserted into said annular groove;

secondary inner and outer urging faces, said secondary inner urging face being formed by an inner peripheral face of said projected cylindrical portion and pressingly contacted with said secondary seal inner receiving face, said secondary outer urging face being formed by an outer peripheral face of said projected cylindrical portion and pressingly contacted with said secondary seal outer receiving face;

a pressing ring which is screwed on said pipe receiving port of said joint body; and a pressing portion which is disposed on said pressing ring, and said pipe joint body, sleeve-like ring, pipe, pressing ring and pressing portion being so constructed and arranged that when said pressing ring is screwed on said pipe receiving port said pressing portion engages said pipe and applies a pressing force in said insertion direction to said pipe and inner ring.

2. A pipe joint made of resin according to claim 1, wherein said connecting portion of said inner ring comprises a bulge portion which has a mountain-like section shape, and which increases a diameter of said pipe into which said connecting portion is pressingly inserted, thereby forming a tertiary seal urging face and a pressure receiving face on an outer peripheral face of said pipe, said tertiary seal urging face having a tapered shape in which the diameter is reduced toward a tip end of said pipe, said pressure receiving face having a tapered shape in which the diameter is increased moving toward the tip end of said pipe, a tertiary seal receiving face which is formed in a flaringly tapered manner and with which said tertiary seal urging face is pressingly contacted is formed at a tip end of said pipe receiving port, and an inner peripheral end of said pressing portion is formed into an annular edge which abuts against said pressure receiving face and which applies said pressing force in the insertion direction to said pressure receiving face.

3. A pipe joint made of resin according to claim 1, wherein a distance in a radial direction between said secondary seal inner and outer receiving faces is set to be 60 to 99% of a thickness of said projected cylindrical portion which coincides with a distance in a radial direction between secondary seal inner and outer urging faces.

4. A pipe joint made of resin according to claim 3, wherein, when a diameter of said secondary seal outer receiving face is indicated by OR1, a diameter of said secondary seal inner receiving face is indicated by OR2, a diameter of said secondary seal outer urging face is indicated by UR1, and a diameter of said secondary seal inner urging face is indicated by UR2, relationships defined by UR1=OR1 and UR2<OR2 are established.

5. A pipe joint made of resin according to claim 3, wherein, when a diameter of said secondary seal outer receiving face is indicated by OR1, a diameter of said secondary seal inner receiving face is indicated by OR2, a diameter of said secondary seal outer urging face is indicated by UR1, and a diameter of said secondary seal inner urging face is indicated by UR2, relationships defined by UR1>OR1 and UR2=OR2 are established.

6. A pipe joint made of resin according to claim 3, wherein, when a diameter of said secondary seal outer receiving face is indicated by OR1, a diameter of said secondary seal inner receiving face is indicated by OR2, a diameter of said secondary seal outer urging face is indicated by UR1, and a diameter of said secondary seal inner urging face is indicated by UR2, relationships defined by $$UR1 > OR1 \text{ and } UR2$$

are established.

7. A pipe joint made of resin according to claim 3, wherein the tip end of said projected cylindrical portion is chamfered in a tapered shape, and a width of a tip end face of said projected cylindrical portion is smaller than the distance in a radial direction between said secondary seal inner and outer receiving faces.

8. A pipe joint made of resin according to claim 1, wherein a distance in a radial direction between said secondary seal inner and outer receiving faces is set to be 70 to 90% of a thickness of said projected cylindrical portion which coincides with a distance in a radial direction between said secondary seal inner and outer urging faces.

9. A pipe joint made of resin according to claim 8, wherein, when a diameter of said secondary seal outer receiving face is indicated by OR1, a diameter of said secondary seal inner receiving face is indicated by OR2, a diameter of said secondary seal outer urging face is indicated by UR1, and a diameter of said secondary seal inner urging face is indicated by UR2, relationships defined by $$UR1 = OR1 \text{ and } UR2 < OR2$$

are established.

10. A pipe joint made of resin according to claim 8, wherein, when a diameter of said secondary seal outer receiving face is indicated by OR1, a diameter of said secondary seal inner receiving face is indicated by OR2, a diameter of said secondary seal outer urging face is indicated by UR1, and a diameter of said secondary seal inner urging face is indicated by UR2, relationships defined by $$UR1 > OR1 \text{ and } UR2 = OR2$$

are established.

11. A pipe joint made of resin according to claim 8, wherein, when a diameter of said secondary seal outer receiving face is indicated by OR1, a diameter of said secondary seal inner receiving face is indicated by OR2, a diameter of said secondary seal outer urging face is indicated by UR1, and a diameter of said secondary seal inner urging face is indicated by UR2, relationships defined by $$UR1 > OR1 \text{ and } UR2 < OR2$$

are established.

12. A pipe joint made of resin according to claim 8, wherein the tip end of said projected cylindrical portion is chamfered in a tapered shape, and a width of a tip end face of said projected cylindrical portion is smaller than the distance in a radial direction between said secondary seal inner and outer receiving faces.

* * * * *

UNITED STATES PATENT AND TRADEMARK OFFICE
CERTIFICATE OF CORRECTION

PATENT NO. : 5,743,572

DATED : April 28, 1998

INVENTOR(S) : Kiyoshi Nishio

It is certified that error appears in the above-identified patent and that said Letters Patent is hereby corrected as shown below:

Claim 6, column 11, line 4, --◊OR2-- should be inserted after "and UR2".

Signed and Sealed this

Fifteenth Day of September, 1998

Attest:

BRUCE LEHMAN

Attesting Officer

Commissioner of Patents and Trademarks